No. 858,128. PATENTED JUNE 25, 1907.
R. WOERNER.
VEGETABLE CHIPPER.
APPLICATION FILED JAN. 4, 1906.

2 SHEETS—SHEET 1.

No. 858,128. PATENTED JUNE 25, 1907.
R. WOERNER.
VEGETABLE CHIPPER.
APPLICATION FILED JAN. 4, 1906.

2 SHEETS—SHEET 2.

Witnesses:
Edwin L. Jewell
John H. Hall

Inventor.
Robert Woerner
By J. W. Schroenborn
Attorney

UNITED STATES PATENT OFFICE.

ROBERT WOERNER, OF MANNHEIM, GERMANY.

VEGETABLE-CHIPPER.

No. 858,128.　　　Specification of Letters Patent.　　　Patented June 25, 1907.

Application filed January 4, 1906. Serial No. 294,599.

*To all whom it may concern:*

Be it known that I, ROBERT WOERNER, a citizen of the Empire of Germany, residing at Mannheim, in the Empire of Germany, have invented a new and useful Vegetable-Chipper, of which the following is a specification.

There are known vegetable cutters or slicers, in which the vegetables to be cut are automatically fed in the manner, that the pressure upon the vegetables is produced by a lever mechanism which is actuated by hand. Such machines present, however, the defect, that the amount of pressure exerted upon the vegetables depends upon the operator, which is objectionable for the ground, that he might unreasonably so increase the pressure as to spoil the vegetables by mere crushing. Moreover in such machines the pressing plates, by means of which the pressure is transmitted to the vegetables, can not be raised sufficiently high above the receivers or baskets to facilitate the introduction of the vegetables, and besides this the projecting levers of the mechanism render the machine bulky and unwieldy. There is also the inconvenience to be found in such machines, that it is not possible to produce the pressure in the proper direction at right angles to the vegetables for any position of the pressing plates, so that the whole mechanism is very apt to jam.

My invention relates to improvements in such machines, whereby the said defects are avoided in the manner, that the required pressure upon the vegetables during the feeding of the latter is exclusively produced by the weight of heavy pressing plates, which are positively guided in a vertical direction, and moreover the advantage is obtained, that with the greater machines a device is supplied, by means of which the pressing plates can be raised up to any height above the receivers for the introduction of the vegetables, a clutch being provided for connecting at will the said device with the driving gear and for disconnecting the same. The chipping disk is either a cutting disk or a rasping disk and both these disks may be exchanged at will, so that the so improved machine may serve either as a vegetable cutter or as a vegetable rasper. The machine is particularly suitable for cutting cabbages.

I will now proceed to describe my invention with reference to the accompanying drawings, in which—

Figure 1:
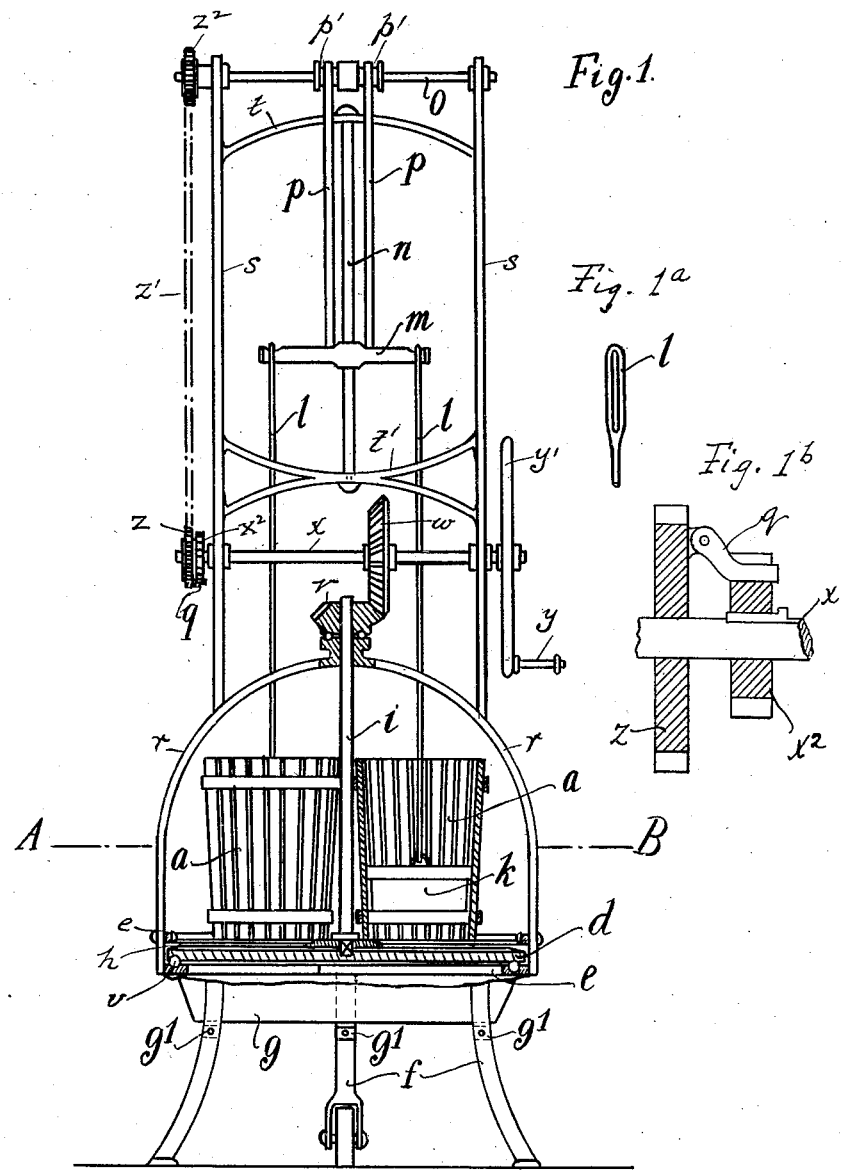
Figure 2:
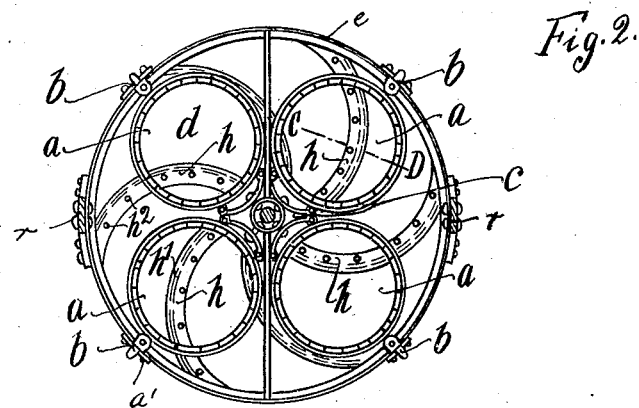

Figure 1 is an elevation of a large vegetable chipper with a cutting disk, partly in section, Fig. 1$^a$, shows an enlarged view of the upper end of the supporting rods; Fig. 1$^b$, shows an enlarged view of the coupling clutch; Fig. 2 is a horizontal section through the same on the line A—B in Fig. 1, Fig. 3 is a vertical section on an enlarged scale through the line C—D in Fig. 2.

Similar letters of reference refer to similar parts throughout the several views.

Figure 3:
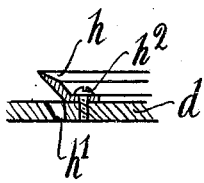

The machine shown at Figs. 1 to 3 consists of a frame, four receivers $a$, four pressing plates $k$, and the mechanism proper. The frame consists of a ring $e$, three legs $f\ f$, a bow $r$, two standards $s\ s$, two cross pieces $t\ t^1$ and a vertical rod $n$. The one leg $f$ is provided with a caster $f^1$, by means of which the whole machine can be transported, after its two other legs $f\ f$ have been raised a little. The ring $e$ is preferably provided with a groove along its periphery, in which balls $u$ are permitted to roll. The circular cutting disk $d$ is provided on its lower side with a corresponding groove along its periphery, so that the balls $u$ engaging in this groove not only support, but also guide the cutting disk $d$. A box $g$ is disposed beneath the cutting disk $d$ for receiving the chippings and is adapted to be drawn out in any known manner. For example the three legs $f\ f$ are shown as provided with supports $g^1\ g^1$, on which the box $g$ may be placed and from which it can be taken off. The cutting disk $d$ is shown as provided with four curved knives $h\ h$, which are fastened on it with screws $h^2$ (see Fig. 3). Along the four knives $h\ h$ the cutting disk $d$ is provided with four curved openings $h^1$, through which the chippings can fall. The cutting disk $d$ is connected with the flange of a vertical shaft $i$, which latter is mounted to turn in a bearing on the bow $r$ and has fastened on it at the upper end a bevel wheel $v$. The two standards $s\ s$ with the cross pieces $t\ t^1$ are fastened on the bow $r$ by any suitable means. A horizontal shaft $x$ is mounted to turn in the two standards $s\ s$ and has fastened on it a large bevel wheel $w$ and a fly wheel $y^1$ with the hand crank $y$ and a loose chain wheel $z$ and a clutch $q$. The large bevel wheel $w$ meshes with the other bevel wheel $v$ and the clutch $q$, which may be of any known construction, is adapted for coupling at will the chain wheel $z$ with the wheel $x^2$ fixed on shaft $x$ or for disconnecting it. (See Fig. 1$^b$.)

In the upper ends of the two standards $s$ $s$ a horizontal shaft $o$ is mounted to turn, which has fastened on it a chain wheel $z^2$ and two belt-pulleys $p^1$ $p^1$. The two chain wheels $z$ and $z^2$ are connected by means of an endless chain $z^1$. Four cylindrical receivers or baskets $a$ $a$ open at top and bottom are secured above the cutting disk $d$ by means of four supporting bolts $b$ $b$ and nuts on the ring $e$ and by means of suitable stays $a^1$ $a^1$ of any known construction. Within these four receivers $a$ $a$ four weights or pressers $k$ $k$ of any known construction are guided, which are suspended from a four-armed crosshead $m$ by means of four vertical rods $l$ $l$. The upper ends of the rods $l$ $l$ are slotted (see Fig. 1$^a$) to render the four pressers $k$ $k$ independent of each other and to permit them to bear with their own weight on the vegetables to be cut or rasped. The crosshead $m$ is guided on the vertical rod $n$ already mentioned and is in turn suspended from the two belt-pulleys $p^1$ $p^1$ by means of two belts $p$ $p$. The length of the four rods $l$ $l$ and of the two belts $p$ $p$ is preferably so made as to prevent the pressers $k$ $k$ in their lowest position from coming in contact with the four knives $h$ $h$, the cutting edges of which might otherwise get damaged.

A rasping disk may be provided for the machine and is arranged to roll on the balls $u$ in the same manner as the cutting disk $d$. This disk is provided with teeth and holes similar to those of known graters and can be connected with the flange of the shaft $i$ in place of the cutting disk $d$.

The machine is operated as follows: When the vegetables are to be cut, the cutting disk $d$ is put in and the chain wheel $z$ is coupled with the shaft $x$ by means of the clutch $q$. Then the shaft $x$ is rotated by turning the hand crank $y$, so that the upper shaft $o$ will equally be put into rotation by means of the chain $z^1$ and the two pulleys $p^1$ $p^1$ will wind the two belts $p$ $p$ on them. Thereby the crosshead $m$ with the four rods $l$ $l$ and the four pressers $k$ $k$ will be raised until the latter are sufficiently high above the four receivers, when the hand crank $y$ is stopped. After the vegetables (such as cabbages or the like) have been put in the four receivers $a$ $a$, the hand crank $y$ is turned back to lower the crosshead $m$ with the four rods $l$ $l$ and the four pressers $k$ $k$, until the latter bear on the vegetables. Thereupon the chain wheel $z$ is disconnected from the shaft $x$ by means of the clutch $q$, so that the crosshead $m$ is permitted to sink by reason of its own weight and to unwind the two belts $p$ $p$ from their pulleys $p^1$ $p^1$, until the crosshead $m$ is checked by its members resting on the lower ends of the slots in the four rods $l$ $l$. Now the hand crank $y$ is turned to put the cutting disk $d$ into rotation by means of the shaft $x$, the two bevel wheels $w$ and $v$ and the shaft $i$. The cutting edges of the four knives $h$ will therefore cut or slice up the vegetables, which are constantly pressed downward by the four pressers $k$ $k$. The chippings will fall through the openings $h^1$ of the cutting disk $d$ into the box $g$. It is evident, that the vegetables will be cut up in the proper manner, as the four pressers $k$ $k$ are at full liberty to press on their respective charges and do not depend upon each other. When any or all the receivers $a$ $a$ have been emptied, the four pressers $k$ $k$ are simultaneously raised in the manner described and the four receivers $a$ $a$ may be recharged. When full, the box $g$ is removed, emptied and again replaced.

For rasping vegetables all that is required, is to replace the cutting disk $d$ by the rasping disk, the respective screws being removed and again replaced. Afterward the machine is operated much the same as before.

The construction of the frame is immaterial and may be varied in any known manner.

What I claim as my invention, and desire to secure by Letters Patent, is—

1. In a vegetable chipper, the combination with a frame, of a horizontal chipping disk turnable on said frame, a vertical shaft connected with said horizontal chipping disk and mounted in said frame to turn, a horizontal driving shaft in said frame and adapted to rotate said vertical shaft, an upper horizontal rotary shaft, means for rotating said upper shaft by the rotation of the horizontal driving shaft, a plurality of receivers open at top and bottom and secured on said frame above said horizontal chipping disk and adapted to receive the vegetables, a plurality of pressers guided in said plurality of receivers and adapted to bear severally by their own weight on the vegetables, a plurality of vertical rods guided in said frame and connected with said plurality of pressers and means for flexibly connecting the vertical rods with the upper horizontal shaft whereby said pressers are adapted to be raised for the charge of said plurality of receivers.

2. In a vegetable chipper, the combination with a frame, of a horizontal chipping disk turnable with its periphery on balls in said frame, a vertical shaft detachably connected with said horizontal chipping disk and mounted in said frame to turn, a bevel wheel at the upper end of said vertical shaft, a bow on said frame above said bevel wheel, a horizontal shaft mounted in said bow to turn, a second bevel wheel fast on said horizontal shaft and meshing with said bevel wheel, a hand crank fast on said horizontal shaft, an upper horizontal rotary shaft, means for rotating said upper horizontal shaft by rotation of the horizontal driving shaft, a plurality of receivers open at top and bottom and secured on said frame above said horizontal chipping disk and adapted to receive the vegetables, a plurality of pressers guided in said plurality of receivers and adapted to bear severally by their own weight on the vegetables, a plurality of vertical rods guided in said frame and connected with said plurality of pressers, and means for flexibly connecting the vertical rods with the upper horizontal shaft whereby said pressers are adapted to be raised for the charge of said plurality of receivers.

3. In a vegetable chipper, the combination with a frame comprising a ring with a groove on the upper side, of a plurality of balls movable in the groove of the ring of said frame, a horizontal chipping disk with a groove along its periphery on the lower side and adapted to turn on said plurality of balls, a vertical shaft detachably connected with said horizontal chipping disk and mounted in said frame to turn, a bevel wheel at the upper end of said vertical shaft, a horizontal shaft mounted in said frame to turn, a second bevel wheel fast on said horizontal shaft and meshing with said bevel wheel, a hand crank fast on said horizontal shaft, a chain wheel loose on said horizontal shaft, a clutch adapted to couple said chain wheel with said horizontal shaft, a vertical rod in said frame above said vertical shaft, a second horizontal shaft mounted to turn in said frame above said horizontal shaft and parallel thereto, a second chain wheel fast on said second horizontal shaft, an endless chain connecting said chain wheel with said first chain wheel, two belt-pulleys fast on said second shaft, a crosshead guided on said vertical rod and comprising a plurality of arms, two belts connecting said crosshead with said two belt-pulleys, a plurality of receivers open at top and bottom and secured on said frame above said horizontal chipping disk and adapted for receiving the vegetables, a plurality of pressers guided in said plurality of receivers and adapted to bear severally by their own weight on the vegetables, and a plurality of vertical rods slotted at the upper ends and carrying said plurality of pressers and guided by means of their slots on the pins of the arms of said crosshead.

In testimony whereof I have signed my name to this specification in the presence of two subscribing witnesses.

ROBERT WOERNER.

Witnesses:
  HENRY HASPER,
  WOLDEMAR HAUPT.